(12) United States Patent
Tanaka

(10) Patent No.: US 6,263,490 B1
(45) Date of Patent: Jul. 17, 2001

(54) GRAPHIC DEVICE CAPABLE OF CARRYING OUT DEBUG OF A DEVICE DRIVER PROGRAM AT A HIGH SPEED

(75) Inventor: Hidenori Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/103,932

(22) Filed: Jun. 25, 1998

(30) Foreign Application Priority Data

Jun. 27, 1997 (JP) .................................................. 9-187766

(51) Int. Cl.[7] ...................................................... G06F 9/45
(52) U.S. Cl. .................................................. 717/4; 714/48
(58) Field of Search ................................ 717/4; 714/46, 714/47, 48, 52; 345/433

(56) References Cited

U.S. PATENT DOCUMENTS

| | | | | |
|---|---|---|---|---|
| 4,755,997 | * | 7/1988 | Takahashi | 714/38 |
| 5,046,023 | * | 9/1991 | Katsura et al. | 345/434 |
| 5,155,821 | * | 10/1992 | Sone et al. | 714/35 |
| 5,361,348 | * | 11/1994 | Nakamoto | 714/38 |
| 5,379,301 | * | 1/1995 | Sato et al. | 717/4 |
| 5,455,936 | * | 10/1995 | Maemura | 714/35 |
| 5,870,601 | * | 2/1999 | Getzlaff et al. | 712/244 |

FOREIGN PATENT DOCUMENTS

| | | | |
|---|---|---|---|
| 64-76090 | 3/1989 | (JP) | G09G/1/00 |
| 4-367902 | 12/1992 | (JP) | G06F/9/32 |
| 5-73356 | 3/1993 | (JP) | G06F/11/28 |
| 5-334449 | * | 12/1993 | (JP) . |
| 6-230769 | 8/1994 | (JP) | G09G/5/36 |
| 8-241419 | * | 9/1996 | (JP) . |

* cited by examiner

Primary Examiner—Kakali Chaki
Assistant Examiner—Tuan Q. Dam
(74) Attorney, Agent, or Firm—Sughrue, Mion, Zinn, Macpeak & Seas, PLLC

(57) ABSTRACT

A graphic LSI is for use in an image processing apparatus having a buffer memory circuit for buffering a drawing data in a specific address to display the drawing data as a graphic drawing on a display unit. The graphic LSI comprises a graphic drawing circuit for producing the specific address in accordance with a drawing command and a debug circuit for putting the image processing apparatus into a debug state when the specific address is coincident with a predetermined address.

12 Claims, 10 Drawing Sheets

GRAPHIC DEVICE CAPABLE OF CARRYING OUT DEBUG OF A DEVICE DRIVER PROGRAM AT A HIGH SPEED

BACKGROUND OF THE INVENTION

This invention relates to a graphic device for use in an image processing apparatus for drawing or painting a graphic form.

In general, an image processing apparatus comprises a graphic large-scale integrated circuit (LSI) which is for use in drawing or painting a graphic form and which is provided in an image processing apparatus. The graphic LSI may be called a graphic device. The graphic LSI is driven by a device driver program which is operated on a central processing unit (CPU) of the image processing apparatus. It is necessary to debug the device driver program in order to prevent an incorrect graphic form.

However, it is difficult to carry out the debug of the device driver program at a high speed in a conventional graphic LSI as will be described later.

SUMMARY OF THE INVENTION

It is therefore an object of this invention to provide an image processing device capable of carrying out debug of a device driver program at a high speed.

Other objects of this invention will become clear as the description proceeds.

On describing the gist of this invention, it is possible to understand that a graphic device is for use in an image processing apparatus comprising buffer memory means for buffering a drawing data in a specific address to display the drawing data as a graphic drawing on a display unit.

According to this invention, the graphic device comprises graphic drawing means for producing the specific address in accordance with a drawing command and debug means for putting the image processing apparatus into a debug state when the specific address is coincident with a predetermined address.

DESCRIPTION OF THE PREFERRED EMBODIMENT

Figure 1:
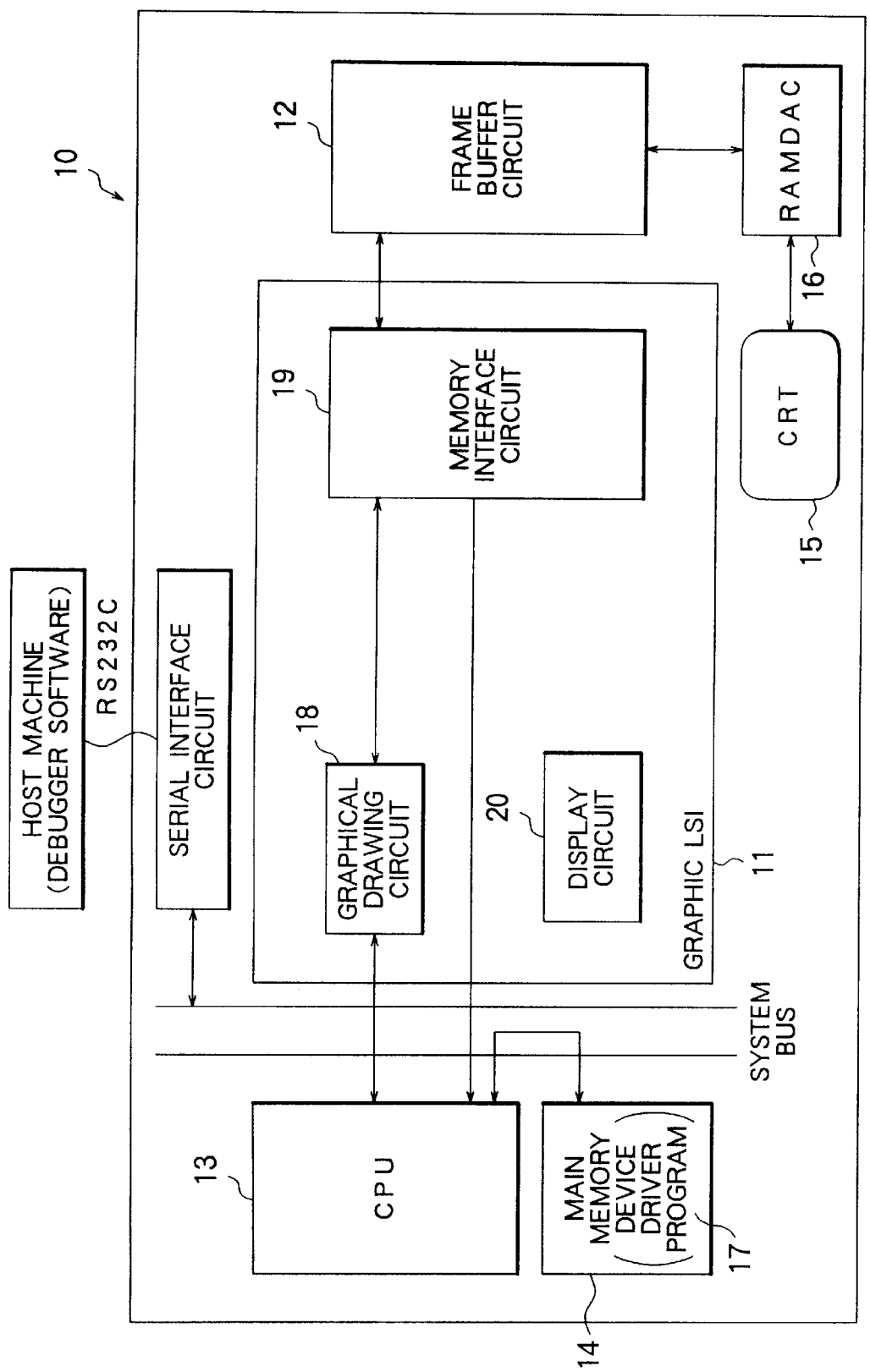
FIG. 1 is a block diagram of a conventional image processing device.

Referring to FIG. 1, a conventional image processing apparatus 10 will be described at first in order to facilitate an understanding of this invention. The illustrated image processing device 10 comprises a graphic large-scale integrated circuit (LSI) 11, a frame buffer 12, a central processing unit (CPU) 13, a main memory 14, a display unit 15, and a RAMDAC 16. The main memory 14 memorizes a device driver program 17. The graphic LSI 11 may be called a graphic device. The display unit 15 may be, for example, a cathode ray tube (CRT). The graphic LSI 11 comprises a drawing circuit 18 and a memory interface circuit 19.

The frame buffer 12 is for buffering a frame data as a drawing data which is displayed on the CRT 15. The CPU 13 read the frame data out of the frame buffer 12 through the memory interface circuit 19. The CPU 13 writes data as the frame data in the frame buffer 12 through the memory interface circuit 19. Furthermore, the CPU 13 supplies a drawing command to the drawing circuit 18 in accordance with the device driver program 17.

On the basis of resolution and the number of colors, the graphic LSI 11 further comprises a display circuit 20 a displaying address in accordance with a synchronization signal and a value of a blank. The drawing circuit 18 has functions such as "line drawing", "rectangular smearing", "rectangular transferring", "line drawing having patterns", "rectangular smearing having patterns", and "rectangular smearing and rectangular transferring being accompanied with a raster operation".

Figure 2:
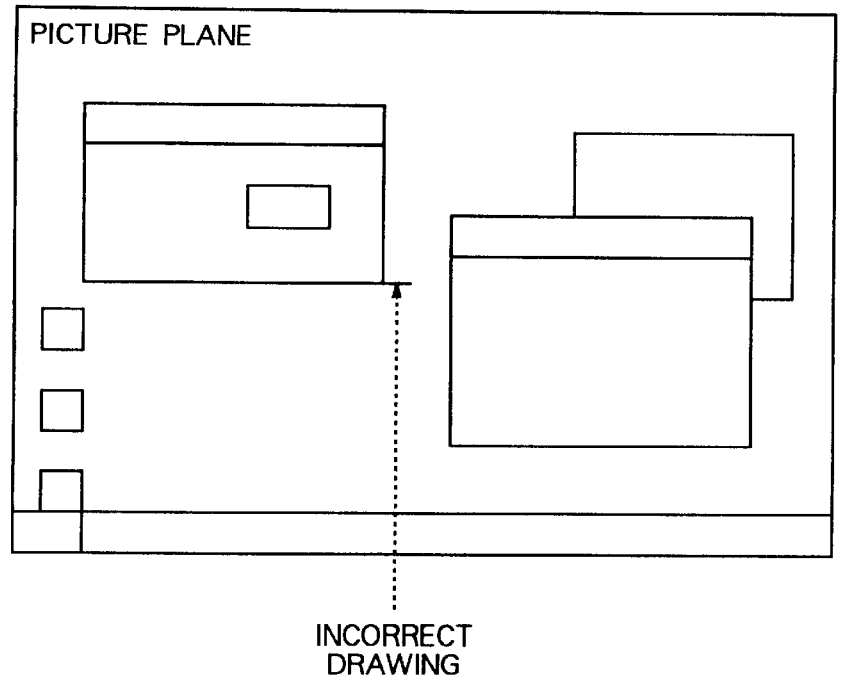
FIG. 2 shows a view for describing a graphical user interface picture and an incorrect drawing picture.

In an operating system (OS) such as Windows, a displaying picture is constructed by a sort of drawings which are drawn by the above-mentioned functions, as shown in FIG. 2.

By the way, the device driver program 17 is for converting a drawing command of the OS into a converted drawing command for devices. In case where a user employs another device different from a function, the device driver program 17 is replaced to another device driver program without changing the OS.

On developing the graphic LSI and the device driver program, a bug such as an incorrect drawing inevitably occurs as shown in FIG. 2. The bug is based on the drawing circuit or the device driver program. When the bug occurs in test operation, a specific one of the drawing commands is specified in the device driver program. The incorrect drawing is based on the specific drawing command. After the specific drawing command is specified in the device driver program, the specific drawing command is modified into a modified drawing command in order to prevent the incorrect drawing. When incorrect drawing occurs in the display picture even if the specific drawing command is modified into the modified drawing command, the drawing circuit may have a circuit bug. As a result, a debug operation is carried out in concern to the graphic LSI.

Figure 4:
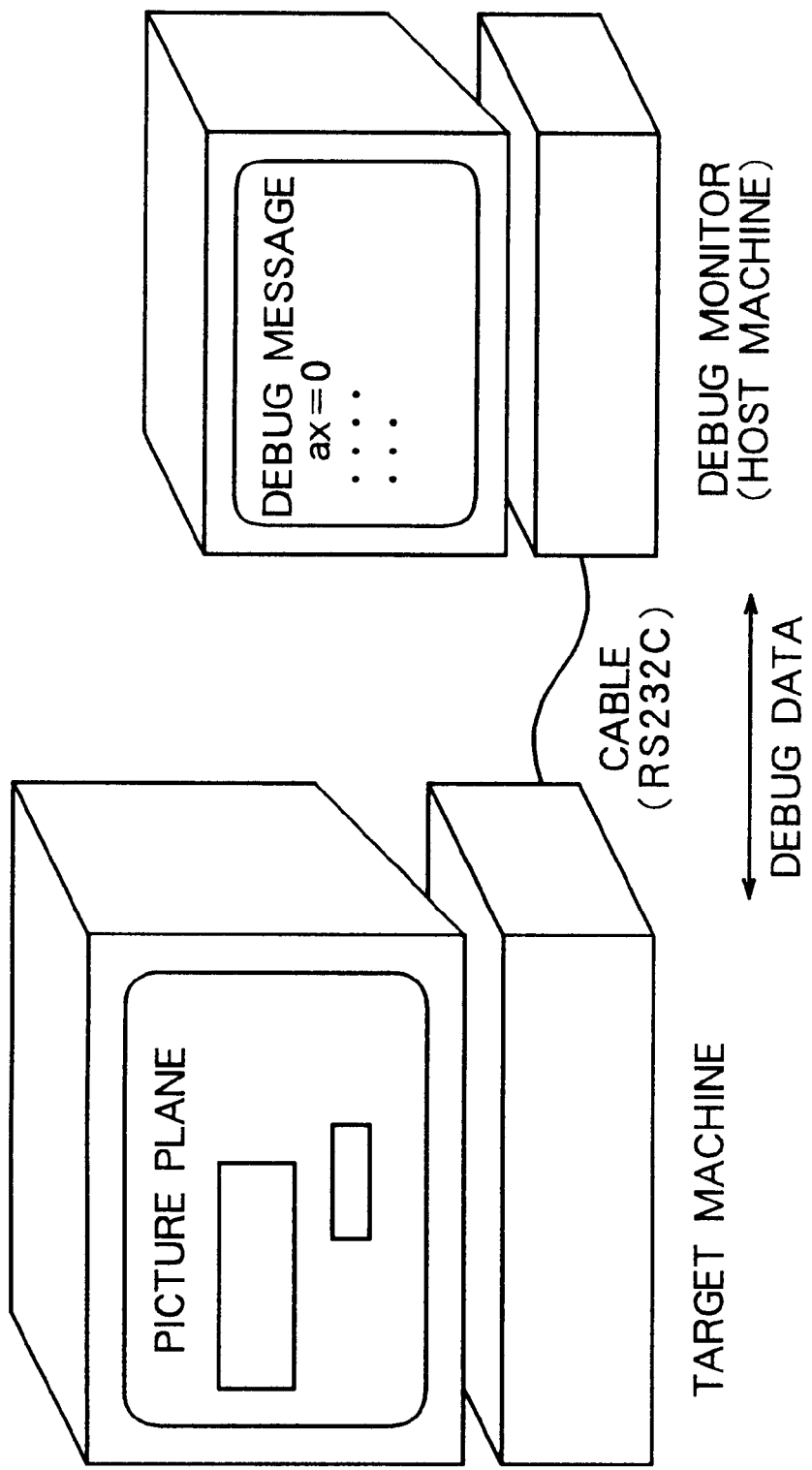
FIG. 4 shows a view for illustrating a conventional debug environment.

Referring to FIG. 4 in addition to FIG. 1, description will be made as regards a fashion for specifying the specific drawing command in the device driver command. As described above, the incorrect drawing is based on the specific drawing command. It will be assumed that the incorrect drawing is confirmed on the display picture as shown in FIG. 2. The image processing apparatus 10 may be called a target machine. The target machine is connected to a host machine (debug monitor) 21 through a serial interface circuit 22 by a cable 23.

A debugger software is operated on the debug monitor 21. By using the debugger software, the debug monitor 21 monitors operation of the device driver program 17 which is operated on the target machine 10 in order to specify the specific drawing command in the device driver program.

By using the debugger software, it is possible to set a temporary stop sentence in the debugger software as known in the art. By the temporary stop sentence, it is possible to confirm each step of the device driver program with monitoring the displaying picture.

Figure 3:
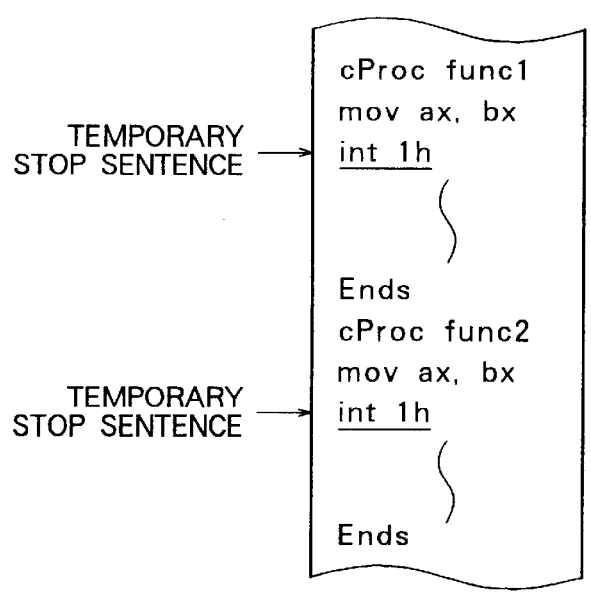
FIG. 3 shows a view for illustrating a temporary stop sentence described in a device driver program.

In addition, it is possible to temporarily stop the operation and to monitor the displaying picture in case of preliminarily writing temporary stop sentences in the device driver program. Each of the temporary stop sentences may be, for example, "int 1h" as shown in FIG. 3. The device driver program has a sort of functions such as "direct drawing function", "rectangular drawing function", and "initializing function". In order to specify a specific one of functions that is concerned to the incorrect drawing, a temporary stop sentence is preliminarily written in a top of each function in source codes.

When the temporary stop sentence are carried out in the target machine 10, operation stops in the target machine 10. As a result, it is possible to monitor the display picture as a stopped display picture in the debug monitor 21 in concern to each function. When the stopped display picture has the incorrect drawing, the bug exists in the function concerned to the temporary stop sentence.

Figure 5:
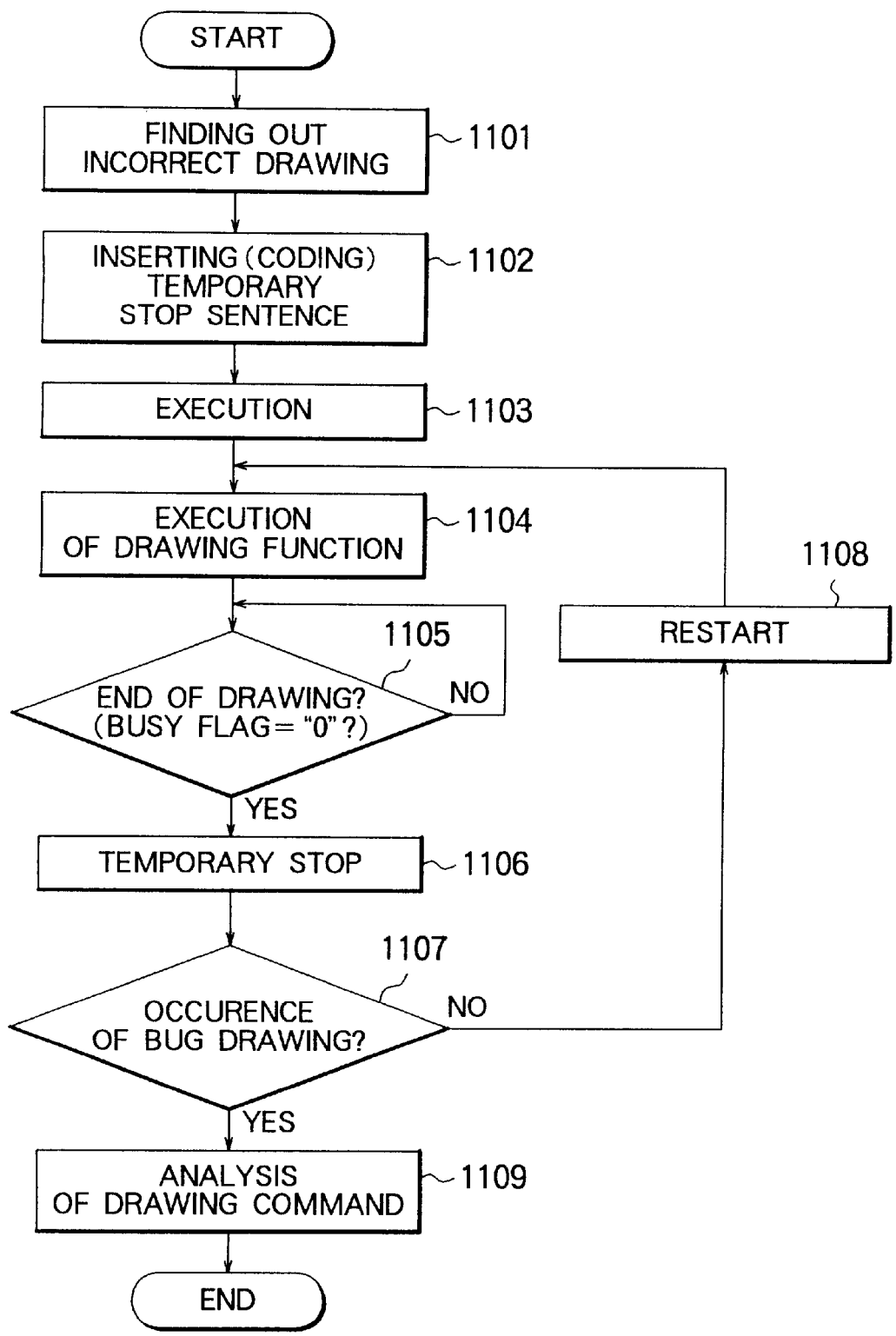
FIG. 5 is a flow chart for describing a conventional debug sequence.

Referring to FIG. 5, description will be made as regards a conventional debug fashion of the device driver program. On finding out the incorrect drawing at a first step 1101, the temporary stop sentence is inserted or coded in the device driver program at a second step 1102 in order to produce a stop sentence inserted program. The stop sentence inserted program is executed to be debugged at a third step 1103. One drawing function is executed at a fourth step 1104. The debugger software confirms whether or not a busy flag is "0" at a fifth step 1105. When the busy flag is "0", the debugger software stops the drawing picture as a stopped picture in accordance with the temporary stop sentence at a sixth step 1106. The operator monitors the stopped picture to check whether or not a bug drawing occurs in the stopped picture at a seventh step 1107. When the bug drawing does not occur in the stopped picture, the debugger software restarts the stop sentence inserted program at an eighth step 1108. When the bug drawing occurs in the stopped picture, analysis is carried out in connection to the drawing command just prior to the bug drawing at a ninth step 1109.

On debugging the device driver program, it takes a long time duration to specify the specific drawing command of the incorrect drawing since the device driver program has a number of functions. Several tens or several hundreds of functions are usually used in case where drawing are carried out in OS having a graphical user interface (GUI) such as Windows. More specifically, the device driver program has a line drawing function, a rectangular smearing function, a rectangular copying function, a character drawing function, an elliptic function, a circular arc function, and poligonal function. Each of functions has a plurality of branching steps such as raster operations. In connection to the above-mentioned seven functions, all of branching steps is equal to 7×265=1834. Therefore, it takes a long time duration to specify the specific drawing command of the incorrect drawing.

Figure 6:
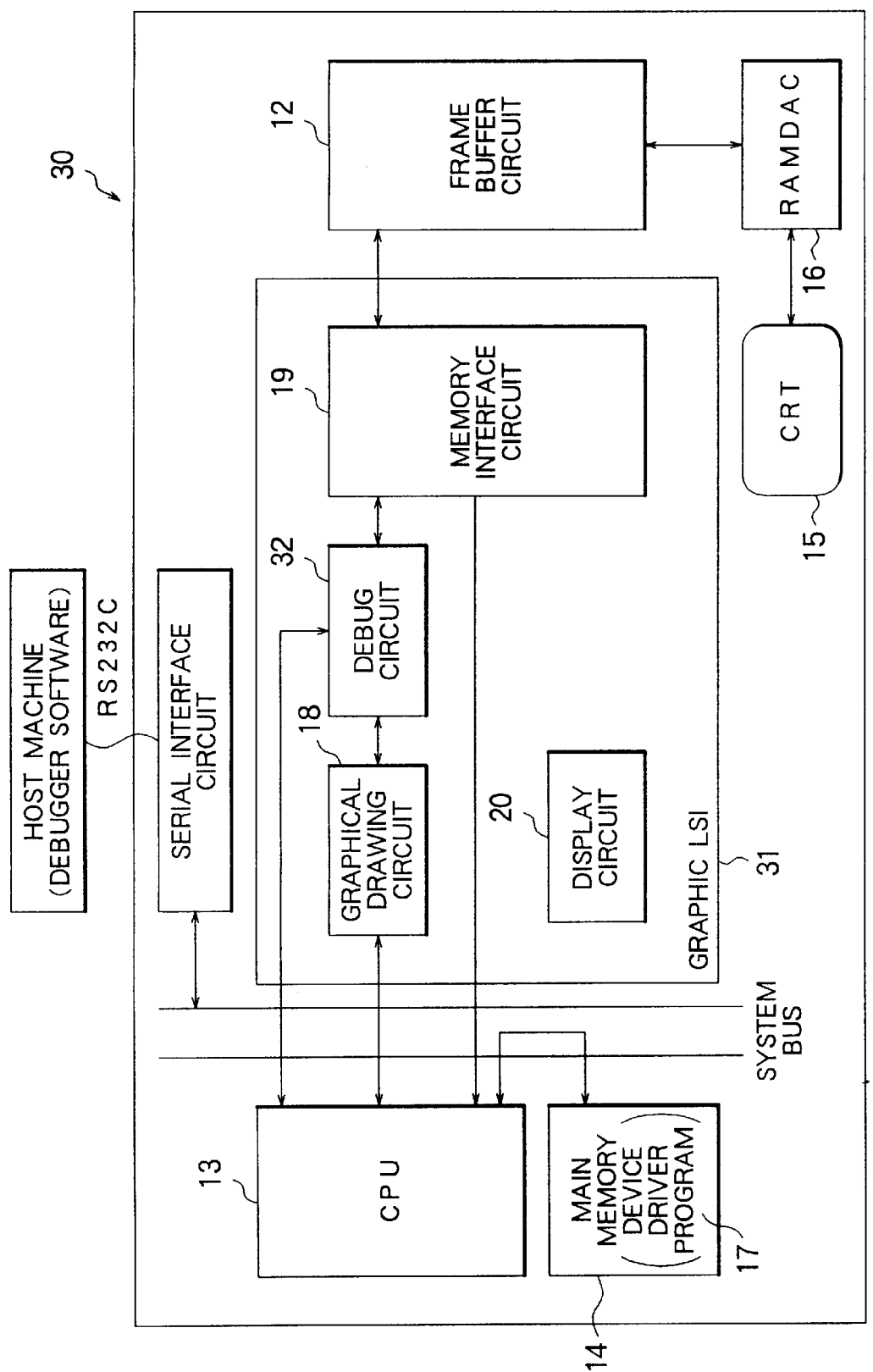
FIG. 6 is a block diagram of an image processing device according to a preferred embodiment of this invention.

Referring to FIG. 6, description will proceed to a graphic device according to a preferred embodiment of this invention. The graphic device will be called a graphic LSI in this embodiment. The graphic LSI is for use in an image processing apparatus. The illustrated graphic LSI is different in structure from the graphic LSI 11 illustrated in FIG. 1. Therefore, the image processing apparatus illustrated in FIG. 6 is designated by a reference numeral 30 and the graphic LSI illustrated in FIG. 6 is designated by a reference numeral 31. The image processing apparatus 30 comprises similar parts which are designated by like reference numerals and operable with likewise named signals. The graphic LSI 31 comprises the drawing circuit 18, the memory interface circuit 19, and a debug circuit 32.

Figure 7:
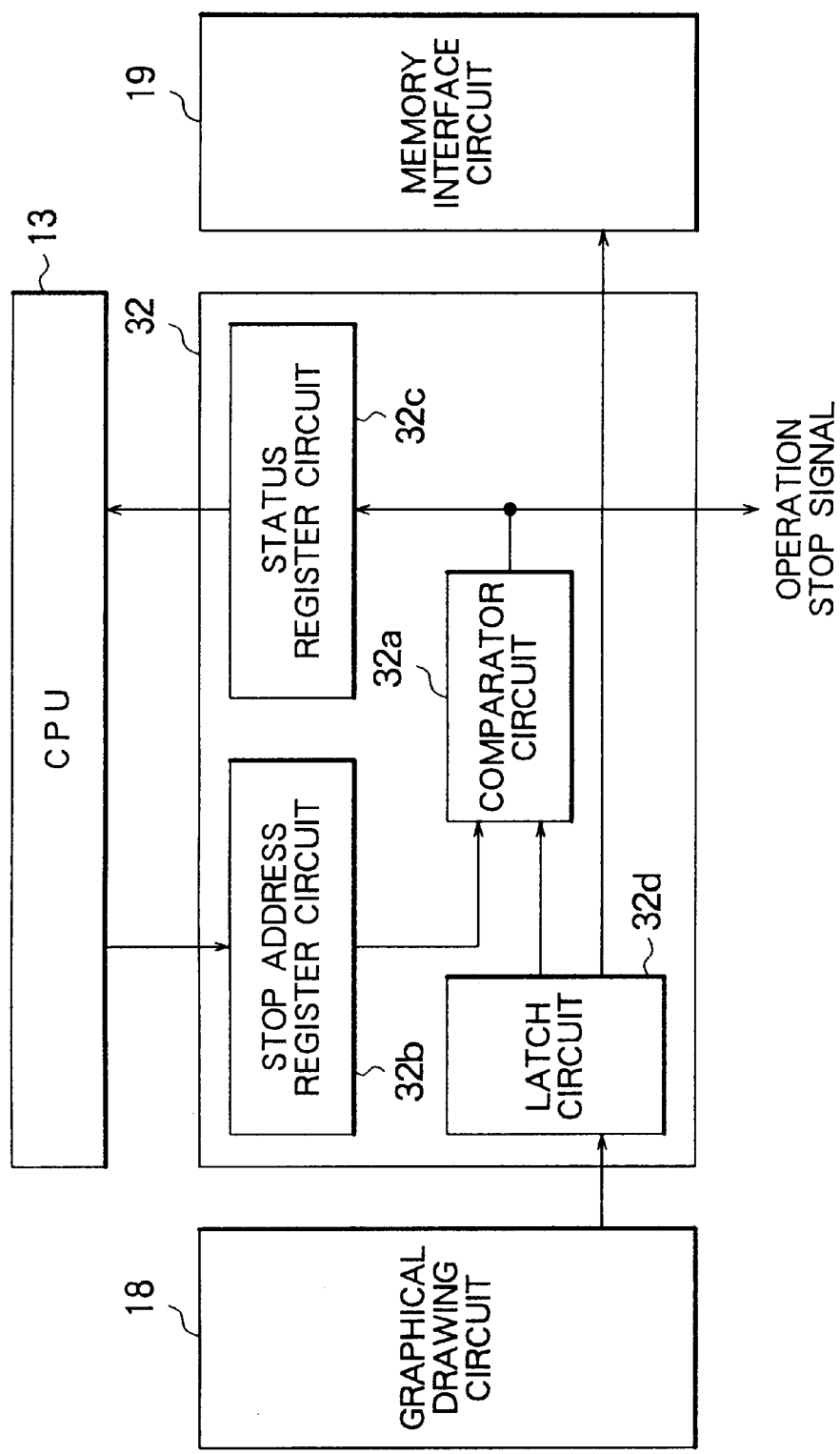
FIG. 7 is a block diagram of an example of a debugging circuit illustrated in FIG. 6.

Referring to FIG. 7 in addition to FIG. 6, description will proceed to a first example of the debug circuit. The debug circuit 32 comprises a comparator circuit 32a, a stop address register circuit 32b, a status register circuit 32c, and a latch circuit 32d. The CPU 13 produces drawing data to store the drawing data in the main memory 14. The CPU 13 executes the device driver program 17. As a result, the CPU 13 supplies the drawing command to the drawing circuit 18. Responsive to the drawing command, the drawing circuit 18 produces write-in signal having a drawing address. The drawing address is latched as a latched address in the latch circuit 32d. The stop address register circuit 32b memorizes a stop address to supply the stop address to the comparator circuit 32a. The stop address is registered in the stop address register 32b by the CPU 13 under control of the debugger software of the host machine. The comparator circuit 32a compares the latched address with the stop address to produce a comparison result representative of whether or not the latched address is coincident with the stop address. The comparison result may be called a address coincidence flag. The address coincidence flag is registered in the status register circuit 32c and is outputted as an operation stop signal.

Figure 8:
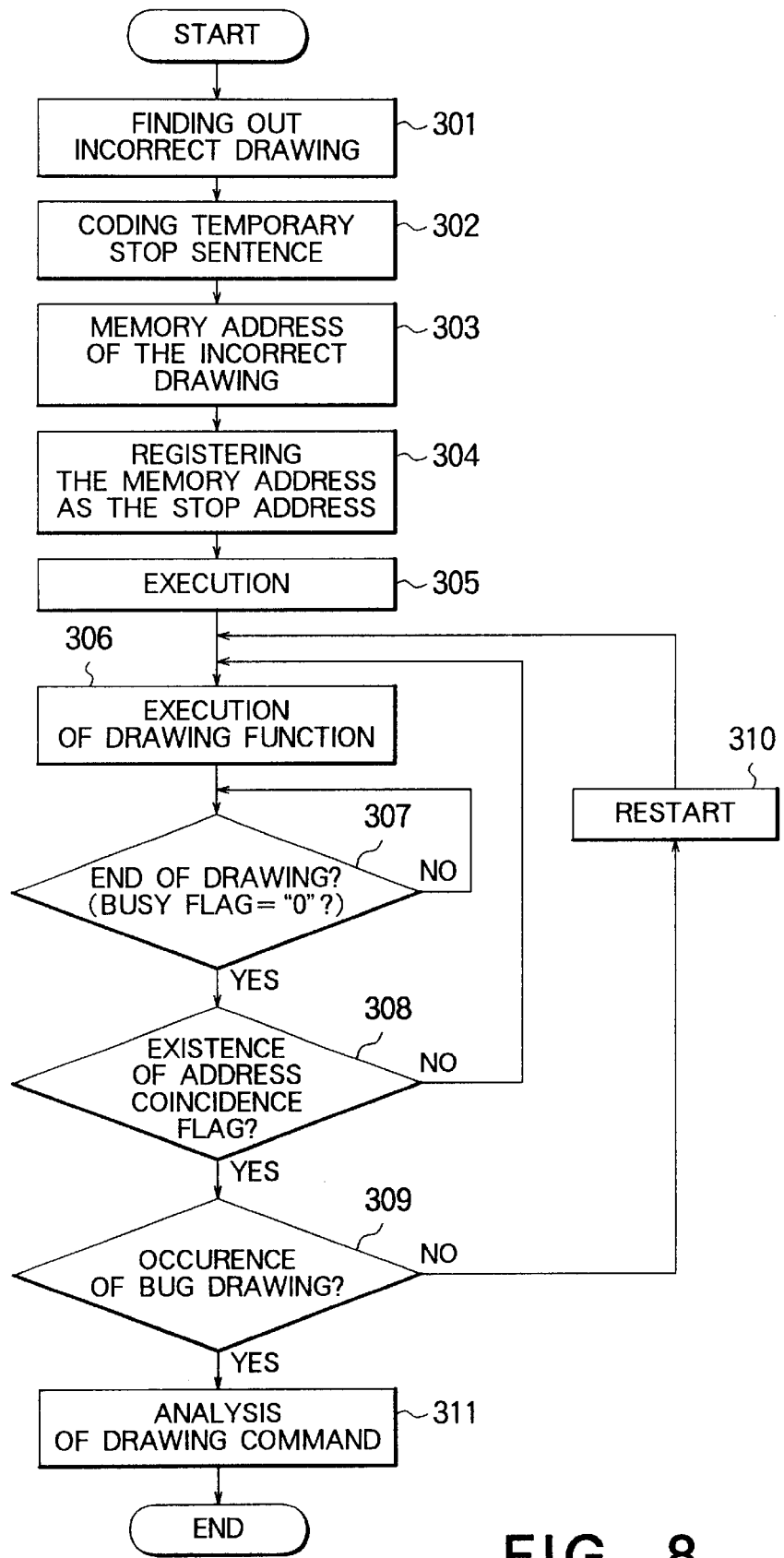
FIG. 8 is a flow chart for describing a debug sequence in the debugging circuit illustrated in FIG. 7.

Referring to FIG. 8, it will be assumed that the incorrect drawing is found out at a first step 301. The temporary stop sentence is inserted or coded in the device driver program at a second step 302 in order to produce the stop sentence inserted program. At a third step 303, a memory address is preliminarily calculated as the stop address which corresponds to a pixel (picture element) on which the incorrect drawing occurs. The pixel may be called an incorrect pixel.

Figure 9:
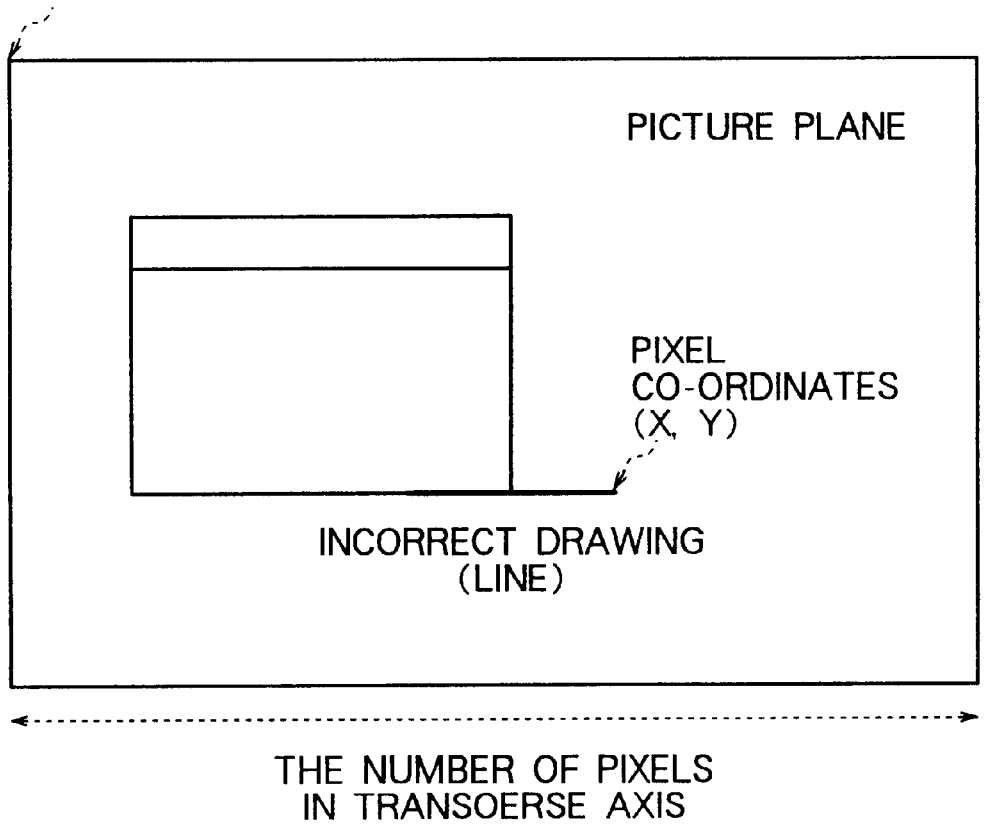
FIG. 9 shows a view for describing a calculation of a stop address in debug sequence illustrated in FIG. 8.

Referring to FIG. 9, the stop address is equivalent to an address on the frame buffer circuit 12 that corresponds to the incorrect pixel. The stop address is given by:

HA+(Y×NM+X)×BYTE, where HA represents a head address in the frame buffer circuit. Y represents Y-coordinate of the incorrect pixel. NM represents the number of pixels along transverse axis (X-axis) of the drawing picture. X represents X-coordinate of the incorrect pixel. BYTE represents the number of bytes in each pixel.

Again referring to FIG. 8, the memory address (buffer address) is registered as the stop address in the stop address register circuit 32b at a fourth step 304 as described above. The stop sentence inserted program is executed to be debugged at a fifth step 305. One drawing function is executed at a sixth step 306. The debugger software confirms whether or not a busy flag is "0" at a seventh step 307. When the busy flag is "0", the debugger software confirms whether or not the address coincidence flag is registered in the status register circuit 32c at an eighth step 308. More particularly, the debugger software determines whether or not the comparator circuit 32a outputs the operation stop signal. When the address coincidence flag is registered in the status register circuit 32c, the debugger software stops the drawing picture as a stopped picture in accordance with the temporary stop sentence. The operator monitors the stopped picture to check whether or not a bug drawing occurs in the stopped picture at a ninth step 309. When the bug drawing does not occur in the stopped picture, the debugger software restarts the stop sentence inserted program at a tenth step 310. The tenth step 310 is followed by the sixth step 306. When the bug drawing occurs in the stopped picture, analysis is carried out in connection to the drawing command just prior to the bug drawing at an eleventh step 311.

Figure 10:
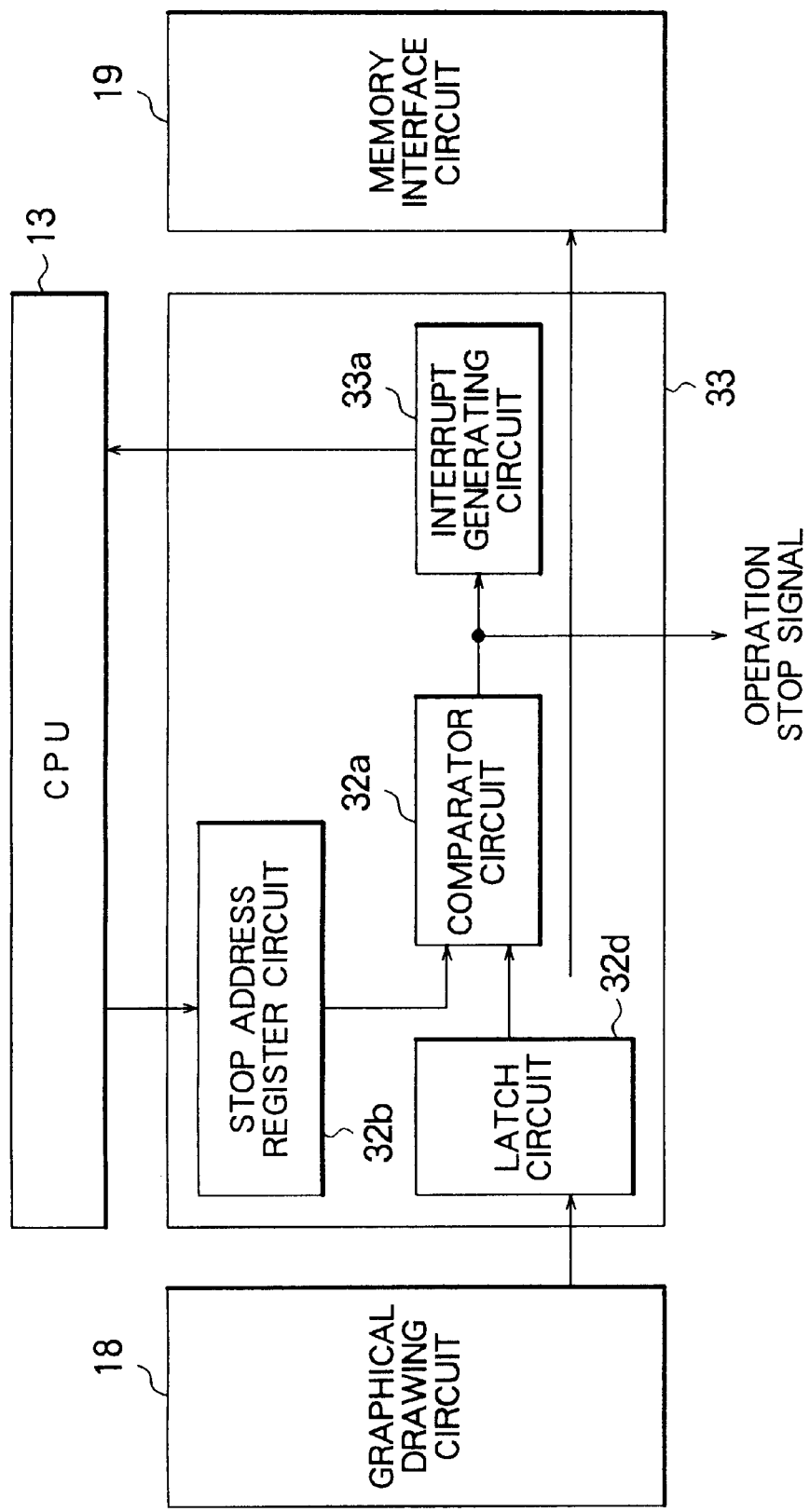
FIG. 10 is a block diagram of another example of a debugging circuit illustrated in FIG. 6.

Referring to FIG. 10, description will proceed to a second example of the debugger circuit illustrated in FIG. 6. The debug circuit illustrated in FIG. 10 is different in structure from the debug circuit 32 illustrated in FIG. 7 and is therefore designated afresh by a reference numeral 33. The debug circuit 33 comprises similar parts which are designated by like reference numerals and operable with likewise named signals.

The debug circuit 33 comprises an interrupt generating circuit 33a instead of the status register circuit 32c. As described in conjunction with FIG. 7, the comparator circuit 32a compares the latched address with the stop address to produce the comparison result signal which is representative of whether or not the latched address is coincident with the stop address. The comparison result signal is outputted as the operation stop signal. When the comparison result signal indicates that the latched address is coincident with the stop address, the interrupt generating circuit 33a generates an interrupt signal which is supplied to the CPU 13.

Figure 11:
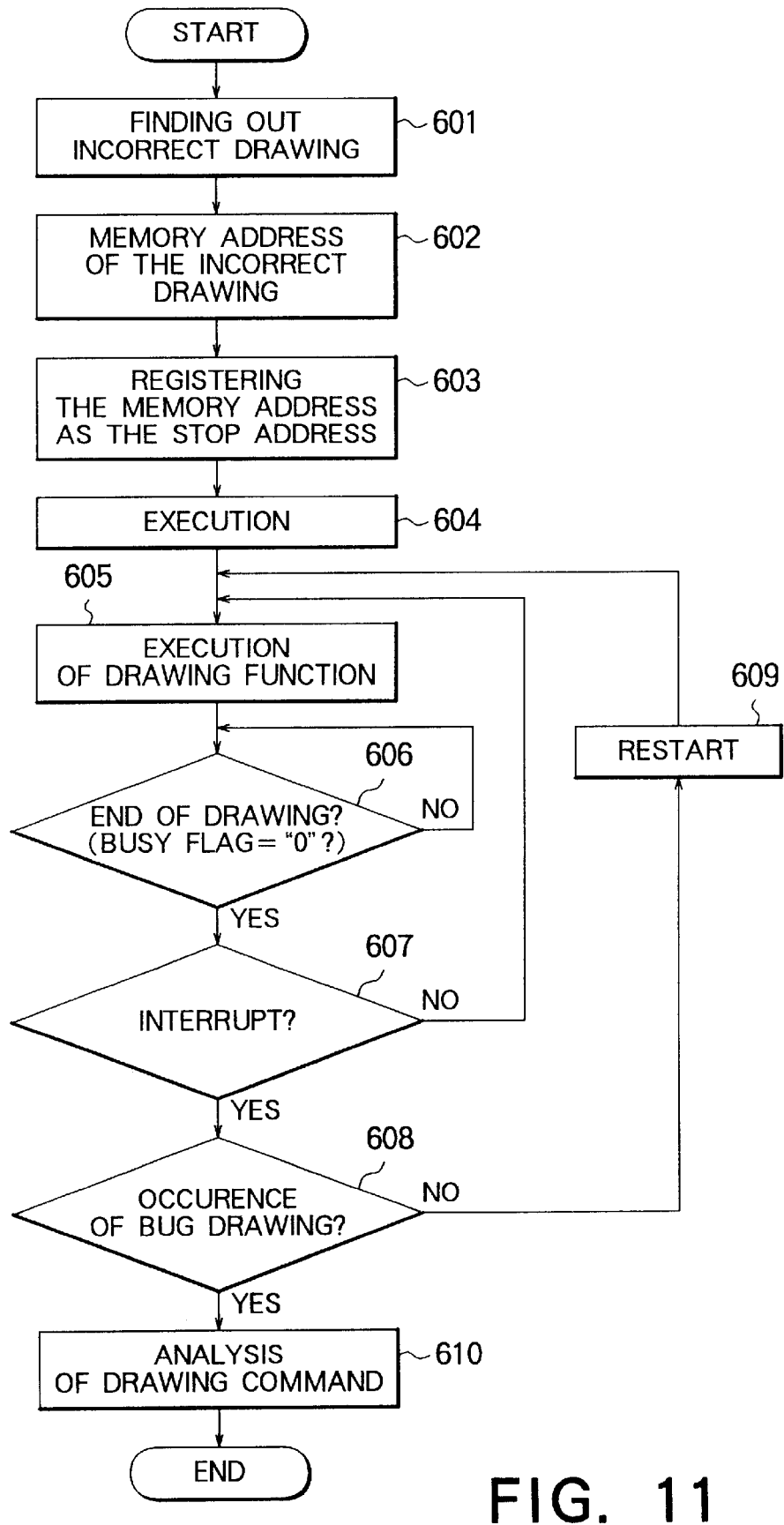
FIG. 11 is a flow chart for describing a debug sequence in the debugging circuit illustrated in FIG. 10.

Referring to FIG. 11 in addition to FIG. 10, it will be assumed that the incorrect drawing is found out in the drawing picture at a first step 601. At a second step 602, the memory address (buffer address) is preliminarily calculated as the stop address which corresponds to the pixel on which the incorrect drawing occurs, as described in conjunction with FIGS. 8 and 9. The pixel may be called the incorrect pixel.

The memory address is registered as the stop address in the stop address register circuit 32b at a third step 603. The device driver program is executed to be debugged at a fourth step 604. One drawing function is executed at a fifth step 605. The debugger software confirms whether or not a busy flag is "0" at a sixth step 606. When the busy flag is "0", the debugger software confirms whether or not the interrupt signal is supplied to the CPU 13 at a seventh step 607. More particularly, the debugger software whether or not the comparator circuit 32a outputs the operation stop signal. When the interrupt signal is supplied to the CPU 13, the debugger software stops the drawing picture as the stopped picture in response to the interrupt signal. The operator monitors the stopped picture to check whether or not a bug drawing occurs in the stopped picture at an eighth step 308. When the bug drawing does not occur in the stopped picture, the debugger software restarts the device driver program at a ninth step 609. The ninth step 609 is followed by the fifth step 605. When the bug drawing occurs in the stopped picture, analysis is carried out in connection to the drawing command just prior to the bug drawing at a tenth step 610.

As readily understood from the above description, the image processing apparatus is put into the debug state when the stop address registered in the stop register circuit is coincident with one of frame buffer addresses. Therefore, it is possible to carry out debug of the device driver program and the hardware at a high speed.

It will be assumed that the incorrect drawing occurs in the drawing picture on the basis of bug in a tabular calculating application. The number of drawings based on a drawing routine is equal to about thousand until all of the drawings finishes. The number of bug drawings based on the drawing routine is equal to about thirty. In case where the conventional graphic LSI is used in the image processing apparatus, it is necessary to carry out stop and restart operations of a thousand in maximum in order to confirm bugs in the device driver program. In case where the graphic LSI of the present invention is used in the image processing apparatus, it is possible to confirm bugs in the device driver program when stop and restart operations of thirty are carried out in maximum.

While this invention has thus far been described in conjunction with the preferred embodiment thereof, it will readily be possible for those skilled in the art to put this invention into practice in various other manners.

What is claimed is:

1. A graphic device for use in an image processing apparatus comprising buffer memory means for buffering a drawing data in a specific address to display said drawing data as a graphic drawing on a display unit, wherein said graphic device comprises:

graphic drawing means for producing said specific address in accordance with a drawing command; and debug means for putting said image processing apparatus into a debug state when said specific address is coincident with a predetermined address that corresponds to an incorrect image.

2. A graphic device as claimed in claim 1, wherein said debug means comprises:

first register means for registering said predetermined address as a stop address;

comparator means for comparing said specific address with said stop address to produce an address coincidence signal when said stop address is coincident with said specific address, and generating means for generating an interrupt signal in response to said address coincidence signal;

said image processing apparatus being put into said debug state in accordance with said interrupt signal.

3. A graphic device as claimed in claim 1, wherein said graphic device is composed of an LSI.

4. A graphic device as claimed in claim 1, wherein said debug means allows said specific address to pass therethrough when said specific address is not coincident with said predetermined address.

5. A graphic device for use in an image processing apparatus comprising buffer memory means for buffering a drawing data in a specific address to display said drawing data as a graphic drawing on a display unit, wherein said graphic device comprises:

graphic drawing means for producing said specific address in accordance with a drawing command; and debug means for putting said image processing apparatus into a debug state when said specific address is coincident with a predetermined address;

wherein said debug means comprises first register means for registering said predetermined address as a stop address;

comparator means for comparing said specific address with said stop address to produce an address coincidence signal when said stop address is coincident with said specific address, and second register means for registering said address coincidence signal as an address coincidence flag;

said image processing apparatus being put into said debug state in accordance with said address coincidence flag.

6. A graphic device as claimed in claim 5, wherein said debug means comprises latch means for latching said specific address as a latched address to supply said latched address to said comparator means and said buffer memory means.

7. A graphic device for use in an image processing apparatus comprising a buffer memory circuit for buffering a drawing data in a specific address to display said drawing data as a graphic drawing on a display unit, wherein said graphic device comprises:

a graphic drawing circuit for producing said specific address in accordance with a drawing command; and a debug for putting said image processing apparatus into a debug state when said specific address is coincident with a predetermined address corresponding to an incorrect image.

8. A graphic device as claimed in claim 7, wherein said debug circuit comprises:

a first register for registering said predetermined address as a stop address;

a comparator for comparing said specific address with said stop address to produce an address coincidence signal when said stop address is coincident with said specific address, and an interrupt generating circuit for generating an interrupt signal in response to said address coincidence signal;

said image processing apparatus being put into said debug state in accordance with said interrupt signal.

9. A graphic device as claimed in claim 7, wherein said graphic device is composed of an LSI.

10. A graphic device as claimed in claim 7, wherein said debug circuit allows said specific address to pass therethrough when said specific address is not coincident with said predetermined address.

11. A graphic device for use in an image processing apparatus comprising a buffer memory circuit for buffering a drawing data in a specific address to display said drawing data as a graphic drawing on a display unit, wherein said graphic device comprises:

a graphic drawing circuit for producing said specific address in accordance with a drawing command; and a debug circuit for putting said image processing apparatus into a debug state when said specific address is coincident with a predetermined address;

wherein said debug circuit comprises:

a first register for registering said predetermined address as a stop address;

a comparator for comparing said specific address with said stop address to produce an address coincidence signal when said stop address is coincident with said specific address, and a second register for registering said address coincidence signal as an address coincidence flag;

said image processing apparatus being put into said debug state in accordance with said address coincidence flag.

12. A graphic device as claimed in claim 11, wherein said debug circuit comprises a latch circuit for latching said specific address as a latched address to supply said latched address to said comparator and said buffer memory circuit.

* * * * *

UNITED STATES PATENT AND TRADEMARK OFFICE
CERTIFICATE OF CORRECTION

PATENT NO. : 6,263,490 B1  
DATED : July 17, 2001  
INVENTOR(S) : Hidenori Tanaka It is certified that error appears in the above-identified patent and that said Letters Patent is hereby corrected as shown below:

<u>Title page,</u>  
Item [56], FOREIGN PATENT DOCUMENTS,  
Please add the following Reference:

-- September 5, 1987 (KR) ...................62-202269 --

Signed and Sealed this

Twenty-sixth Day of March, 2002

Attest:

JAMES E. ROGAN  
*Attesting Officer*       *Director of the United States Patent and Trademark Office*